US011201724B2

(12) United States Patent
Gouget

(10) Patent No.: US 11,201,724 B2
(45) Date of Patent: Dec. 14, 2021

(54) METHOD TO COUNTER DCA ATTACKS OF ORDER 2 AND HIGHER ON TABLE-BASED IMPLEMENTATIONS

(71) Applicant: GEMALTO SA, Meudon (FR)

(72) Inventor: Aline Gouget, Gemenos (FR)

(73) Assignee: GEMALTO SA, Meudon (FR)

( * ) Notice: Subject to any disclaimer, the term of this patent is extended or adjusted under 35 U.S.C. 154(b) by 330 days.

(21) Appl. No.: 16/337,197

(22) PCT Filed: Sep. 22, 2017

(86) PCT No.: PCT/EP2017/074062
§ 371 (c)(1),
(2) Date: Mar. 27, 2019

(87) PCT Pub. No.: WO2018/060094
PCT Pub. Date: Apr. 5, 2018

(65) Prior Publication Data
US 2019/0229886 A1 Jul. 25, 2019

(30) Foreign Application Priority Data

Sep. 27, 2016 (EP) .................................... 16306234

(51) Int. Cl.
*H04L 9/00* (2006.01)
*H04L 9/06* (2006.01)

(52) U.S. Cl.
CPC ............ *H04L 9/002* (2013.01); *H04L 9/0618* (2013.01); *H04L 9/0631* (2013.01); *H04L 2209/043* (2013.01); *H04L 2209/16* (2013.01)

(58) Field of Classification Search
CPC . H04L 9/002; H04L 9/0631; H04L 2209/043; H04L 2209/16; G06F 21/75; G06F 21/14
See application file for complete search history.

(56) References Cited

U.S. PATENT DOCUMENTS

2009/0086976 A1* 4/2009 Scian ...................... H04L 9/003
380/277
2011/0091034 A1 4/2011 Teglia
(Continued)

FOREIGN PATENT DOCUMENTS

KR 20010008418 A 1/2011
KR 20130041353 A 4/2013

OTHER PUBLICATIONS

Standaert FX., Petit C., Veyrat-Charvillon N. (2012) Masking with Randomized Look Up Tables. In: Naccache D. (eds) Cryptography and Security: From Theory to Applications. Lecture Notes in Computer Science, vol. 6805. Springer, Berlin, Heidelberg. https://doi.org/10.1007/978-3-642-28368-0_19 (Year: 2012).*

(Continued)

*Primary Examiner* — David J Pearson
(74) *Attorney, Agent, or Firm* — The Jansson Firm; Pehr B. Jansson

(57) ABSTRACT

The present invention relates to a method to counter DCA attacks of order 2 and higher order applied on an encoded table-based (TCabi,j) implementation of block-cipher of a cryptographic algorithm to be applied to a message (m), said method comprising the steps of: —translating a cryptographic algorithm block-cipher to be applied on a message (m) into a series of look-up tables (Tabi,j),—applying secret invertible encodings to get a series of look-up tables (TCi, j),—computing message-dependent masking values, comprising the computation of at least two shares of masking value (mmask1, mmask2) for the input of the table network based on at least two different message derivation functions (F1, F2),—re-randomizing the tables (TCi,j) using the computed message-dependent masking values (mmask1, mmask2),—computing rounds to be applied on the message (m) based on the randomized network of tables (TCi,j).

9 Claims, 4 Drawing Sheets

(56) References Cited

U.S. PATENT DOCUMENTS

| | | | |
|---|---|---|---|
| 2013/0016836 A1 | 1/2013 | Farrugia | |
| 2014/0165030 A1* | 6/2014 | Chevallier-Mames | ............... G06F 21/14 717/110 |
| 2016/0269175 A1* | 9/2016 | Cammarota | ............ H04L 9/002 |
| 2017/0033921 A1* | 2/2017 | Michiels | ................. H04L 9/002 |
| 2017/0033922 A1* | 2/2017 | Michiels | ................. G06F 21/72 |
| 2017/0149559 A1* | 5/2017 | Michiels | ............... H04L 9/0625 |
| 2018/0167196 A1* | 6/2018 | Cooper | ................ H04L 9/0625 |

OTHER PUBLICATIONS

Sasdrich P., Moradi A., Güneysu T. (2016) White-Box Cryptography in the Gray Box. In: Peyrin T. (eds) Fast Software Encryption. FSE 2016. Lecture Notes in Computer Science, vol. 9783. Springer, Berlin, Heidelberg. https://doi.org/10.1007/978-3-662-52993-5_10 (Year: 2016).*

High Order Masking of the AES, Kai Schramm, Et Al, Horst Görtz Institute for IT Security(HGI), Universitätsstr. 150, Ruhr University Bochum, Germany 44780. D. Pointcheval (Ed): CT-RSA 2006, LNCS 3860, pp. 208-225, 2006.

Bos Joppe W et al: "Differential Computation Analysis: Hiding Your White-Box Designs is Not Enough", Aug. 4, 2016, Network and Parallel Computing; [Lecture Notes in Computer Science; Lect. Notes Computer], Springer International Publishing, Cham, pp. 215-236, XP047352079, ISSN: 0302-9743 ISBN: 978-3-642-19166-4 [retrieved on Aug. 4, 2016] section 6.

PCT/EP2017/074062 International Search Report, dated Nov. 28, 2017, European Patent Office, P.B. 5818 Patentlaan 2 NL—2280 HV Rijswijk.

PCT/EP2017/074062 Written Opinion of the International Searching Authority, dated Nov. 28, 2017, European Patent Office, D-80298 Munich, Germany.

* cited by examiner

— Prior Art —

— *Prior Art* —

METHOD TO COUNTER DCA ATTACKS OF ORDER 2 AND HIGHER ON TABLE-BASED IMPLEMENTATIONS

FIELD OF THE INVENTION

The present invention relates to a method to counter DCA attacks of order 2 and higher order applied on an encoded table-based implementation of block-cipher. More specifically, the invention concerns the software implementation of cryptographic block-ciphers, like DES and AES, known under the "white-box" term.

The invention also pertains to a device implementing said method.

BACKGROUND OF THE INVENTION

The idea behind white-box implementation is to embed the secret key in the implementation of the cryptographic operations such that it becomes difficult for an attacker to extract information about this secret key.

The academic study of white-box cryptography was initiated in 2002 in the seminal work of Chow, Eisen, Johnson and van Oorschot. They presented some generic techniques that can be used to help create cryptographic implementations that resist key-extraction. They applied those techniques to produce example implementations of the block-ciphers AES and DES. For now, all the academic white-box techniques have been theoretically broken using cryptanalysis techniques.

However, commercial solutions based on white-box cryptography are available on the market.

Differential Computational Analysis (DCA) is an attack recently introduced to assess the security of white-box implementations. It is the software counterpart of the differential power analysis (DPA) attack. Similarly to what is done for DPA, the attacker has to collect software traces during the execution of the cryptographic implementation.

The authors of the DCA paper have developed plugins to produce software execution traces which contain information about the memory addresses being accessed. Using these traces, the authors showed how DCA can extract the secret key from all publicly available white-box programs, including non-commercialized ones, implementing standardized cryptography. This attack requires neither knowledge about the look-up tables use nor significant reverse engineering effort.

The commonly suggested way to thwart first-order DPA is random masking which can be applied to counter DCA attacks. An important difference between the smart-card context and the white-box context is that while smart-cards usually provide a reliable source of entropy, it is not the case in the white-box environment. Then, the random masking countermeasure has to be adapted to the white-box environment. Moreover, it is known, however, that masking can be defeated if the attacker knows how to correlate power consumption more than once per computation.

This is known as second-order, or more generally higher-order power analysis. These DPA attacks of high order are known to be more complex to mount in practice. Similarly to what is defined for DPA attacks, high order DCA attacks can be considered when the attacker tries to correlate computational values more than once per execution. High order attacks seem to be much easier to mount in the context of software security than it is the case for side-channel analysis.

The DCA attack is recent and, for now, the DCA of order 1 is sufficient to attack white-box implementations. For preventing the DCA attack of order 1, it is possible for example to use the variable encodings as it is proposed in EP 2406916 for example. No obvious alternative way are known to solve the same technical problem.

Also, for now, the DCA attack has not been generalized to second order DCA or higher order. This is probably the reason why high order DCA attacks are not considered for now in the literature. What is novel is to propose a countermeasure against a generalization of the DCA attack.

In any case, such second order attacks are awaited and countermeasures are thus desirable.

SUMMARY OF THE INVENTION

The present invention aims at providing a software implementation of a block-cipher that can be resistant against a straightforward DCA of order 2 or higher order.

The invention is based on an encoded table-based implementation of a cryptographic DES/AES, for example as proposed by Chow et al.

Such implementation is used to provide local security which means that it is not possible to extract any useful information by examining the encoded S-box. This means that an attack must be non-local. However, the encoded table-based implementation of DES/AES that has been proposed by Chow et al. is not resistant to DCA of any order.

The invention thus aims at avoiding, or at least making more difficult the above-mentioned malicious DCA attacks.

More generally the invention is a countermeasure applied on an encoded table-based implementation in order to be resistant to the DCA of order 2 or higher order t and to be resistant against combined attacks where an attacker is able to fix at most 1, or a higher number p-1, of relevant values during the execution.

The present invention is defined, in its broadest sense, as a method to counter DCA attacks of order 2 and higher order applied on an encoded table-based implementation of block-cipher of a cryptographic algorithm to be applied to a message, said method comprising the steps of:
 translating a cryptographic algorithm block-cipher to be applied on a message into a series of look-up tables,
 applying secret invertible encodings to get a series of look-up tables,
 computing message-dependent masking values, comprising the computation of at least two shares of masking value denoted mmask1 and mmask2 for the input of the table network based on at least two different message derivation functions F1 and F2,
 re-randomizing the tables using the computed message-dependent masking values,
 computing rounds to be applied on the message based on the randomized network of tables.

This solution would require for the attacker to modify at least 2 values or a higher number of values in a combined attack. One additional property is that if the attacker succeeds in setting to a constant one relevant value or p-1 relevant values during the execution, then the randomization method continues to act.

Therefore, the method according to the present invention allows reducing the risks of malicious attacks. At least, the attacks are more complex to carry out for a malicious attacker.

According to a preferred embodiment, the computation of at least two shares of masking value denoted mmask1 and mmask2 for the input of the table network is further based on at least two secret constant values emask1 and emask2 obfuscated in the code using obfuscation techniques.

This enables to prevent an attacker from being able to compute the values of the masking values mmask1 and mmask2 in the case the attacker has guess or reverse the specification of the derivation functions that are applied on the input message m. Indeed, the knowledge of the obfuscated values emask1 and emask2 are needed to be able to compute mmask1 and mmask2.

In a particular implementation, the at least two shares of masking values are obtained as follows, with n being an integer depending on the concerned cryptographic algorithm block-cipher:

h1=F1(m) (or h1=F1(M))
h2=F2(m) (or h2=F2(M))
mmask1=emask1⊕trunc1—n(h1)⊕trunc1—n(h2)
mmask2=emask2⊕truncn+1—2n(h1)⊕truncn—2n(h23).

This implementation enables to guarantee that, assuming that an attacker attempts to fix one value to a constant value during the computation of h1 and h2 or the truncation process of h1 and h2, then neither of the two values mmask1 and mmask2 will be constant, and assuming that the attacker attempts to fix one value at the end of the computation of mmask1 and mmask2, then one of the two values won't be a constant. This implementation prevents the possibility for an attacker to use a single point of failure that would set to a constant value mmask1 and mmask2 while modifying only one value.

According to a first application, the cryptographic algorithm block-cipher being part of a DES algorithm, n=96.

This corresponds to the application of the invention to a DES algorithm. The message m is the input-message to the block-cipher DES of length 64 bits. The function F1 can be applied for example on the input block message m or on the block message after the initial permutation IP of the DES and M=IP(m) has length 64 bits. The output length of F1 and F2 192 bits or greater and the length of emask1, emask2, mmask1 and mmask2 is 96 bits.

According to another application, the cryptographic algorithm block-cipher being part of an AES algorithm, n=128.

This corresponds to the application of the invention to an AES algorithm. The message m is the input-message to the block-cipher AES of length 128 bits. The output length of F1 and F2 256 bits or greater and the length of emask1, emask2, mmask1 and mmask2 is 128 bits.

According to an advantageous feature of the invention, a random secret function is further used to derive all the masking values, said random secret function being accumulatively applied on several layers of tables.

With this feature, it is possible to derive in a deterministic way, on the one hand from mmask1 and on the other hand from mmask2, two sequences of masking values that will be used through the different layers of tables in the implementation in order to mask the input and output values of the tables. In order to prevent the attacker to derive the masking values from an intermediate masking values, the specification of the derivation function has to be kept secret as much as possible.

Even more advantageously, the random secret function is accumulatively applied on successive layers of tables.

By applying the random secret function accumulatively on successive layers of table, it increases the complexity of side-channel analysis since the masking values are changed at every layer of tables in the implementation. The advantage is that it reduces the risk of information leakage due to the multiple use of the same masking value.

According a particular implementation, the accumulative application of the random secret function is as follows, i being the index of the table of the first layer: for the first layer of tables, computation of, for all x, with mmask1,l being the value of the mask of the table i in the first layer:

TC_{i,1,mmask1,i}^{G(mmask1,i)}=TC_{i,1}(x⊕mmask1,i)⊕G (mmask1,i) and, for all x, TC_{i,1,mmask1,i⊕mmask2,i}^{G(mmask1,i)⊕G(mmask2,i)}=TC_{i,1,mmask1,i}^{G(mmask1,i)}(x⊕mmask2,i)⊕G mmask2,i).

Such an application on a first layer provides security advantages as the value of the masking on input (i.e. mmask1,i⊕mmask2,i) is never explicitly computed and the value of the masking on output (i.e. G(mmask1,i)⊕G (mmask2,i) is also never explicitly computed while the table is indeed randomized with the value mmask1,i⊕mmask2,i on input and with the value G(mmask1,i)⊕G(mmask2,i) on output. Then, the attacker cannot correlate a masking value and its mask by observing only two values. It is also noted that the masking values are different for every table in the same layer.

According to a further implementation, the accumulative application of the random secret function is as follows, i being the index of the table for the second layer, computation of, for all x, T_{i,2,G(mmask1,i)}^{G(G(mmask1,i))}=T_{i,2}G(⊕G(mmask1,i))⊕G(G(mmask1,i)) and, for all x, T_{i,2, G(mmask1,i)⊕G(mmask2,i)}^{G(G(mmask1,i))⊕G(G(mmask2,i))}=T_{i,2,G(mmask1,i)}^{G(G(mmask1,i))} (x⊕G(mmask2,i)⊕G(G(mmask2,i)).

With such an application on the second layer, the method further present the same advantage as for the first layer and in addition, the derivation of new masking values prevent the attacker from being able to detect internal collisions of intermediate values between the first and second layers.

On a general principle, the accumulative application of the random secret function is as follows, i being the index of the table in the layer j, for the other layers j, computation of, for all x, T_{i,j,G(j-1) (mmask1,i)}^{G(j) (mmask1,i)}=T_{i,j}(x⊕G(j-1) (mmask1,i))⊕G(j) (mmask1,i) and, for all x, T_{i,j, G(j-1) (mmask1,i)⊕G(j-1) (mmask2,i)}^{G(j) (mmask1,i)⊕G(j) (mmask2,i)}=T_{i,j, G(j-1) (mmask1,i)}^{G(j) (mmask1,i)} (x⊕G(j-1)(mmask2,i)⊕G(j) mmask2,i).

This implementation enables to increase the complexity of a side-channel analysis at each layer.

According to an advantageous feature, the message is firstly combined with a first share of masking value and then the result is combined with the next share of masking value.

This feature is advantageous as it enables to compute the masked message without computing explicitly the masking value. Indeed, only the shares of the masking value are manipulated during the execution of the program.

Advantageously, in a generalized way, the step of computing message-dependent masking values comprises the computation of t values mmask1, mmask2, . . . , mmaskt for the input of the table network based on t secret constant values obfuscated in the code using obfuscation techniques and p derivation functions F1, . . . , Fp.

Such a generalized embodiment provides security against DCA of order t. Randomization using the message has to be kept up to p−1 fixing of relevant values by an attacker during execution. This means that the attacker would require at least p relevant modifications of values during execution in order to mount a combined attack.

According to a generalized application of the invention, the first step randomizes the tables of the first layer using the masking value mmask1 on the input and G(mmask1) on the output, the second step re-randomizes the tables of the previous step using the masking value mmask2 on the input and G(mmask2) on the output, . . . , the tth step re-randomizes the tables of the previous step using the masking value mmaskt on the input and G (mmaskt) on the output, the t+1 step then randomizes the tables of the second layer using the masking values on input G(mmask1), . . . , G(mmask) and the masking values on the output of the tables G(G(mmask1)), . . . , G(G(mmask)), and so on until a 2t step for the second layer, and, successively, in general, each (j−1)*t+1 step randomizing the tables of the jth layer by using on input the masking values G(j−1)(mmask1), . . . , G(j−1)(mmask) and on the output G(j)(mmask1), . . . , G(j)(mmask) and so on until a j*t step for the layer j.

Such an implementation gives a higher level of protection of the implemented algorithm that depends on t that is the expected maximal number of values an attacker is assumed to be able to correlate and the value p that is the expected maximal number of values an attacker is assumed to be able to modify per execution trace.

The present invention also relates to a device having computing resources to implement the method of the invention.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
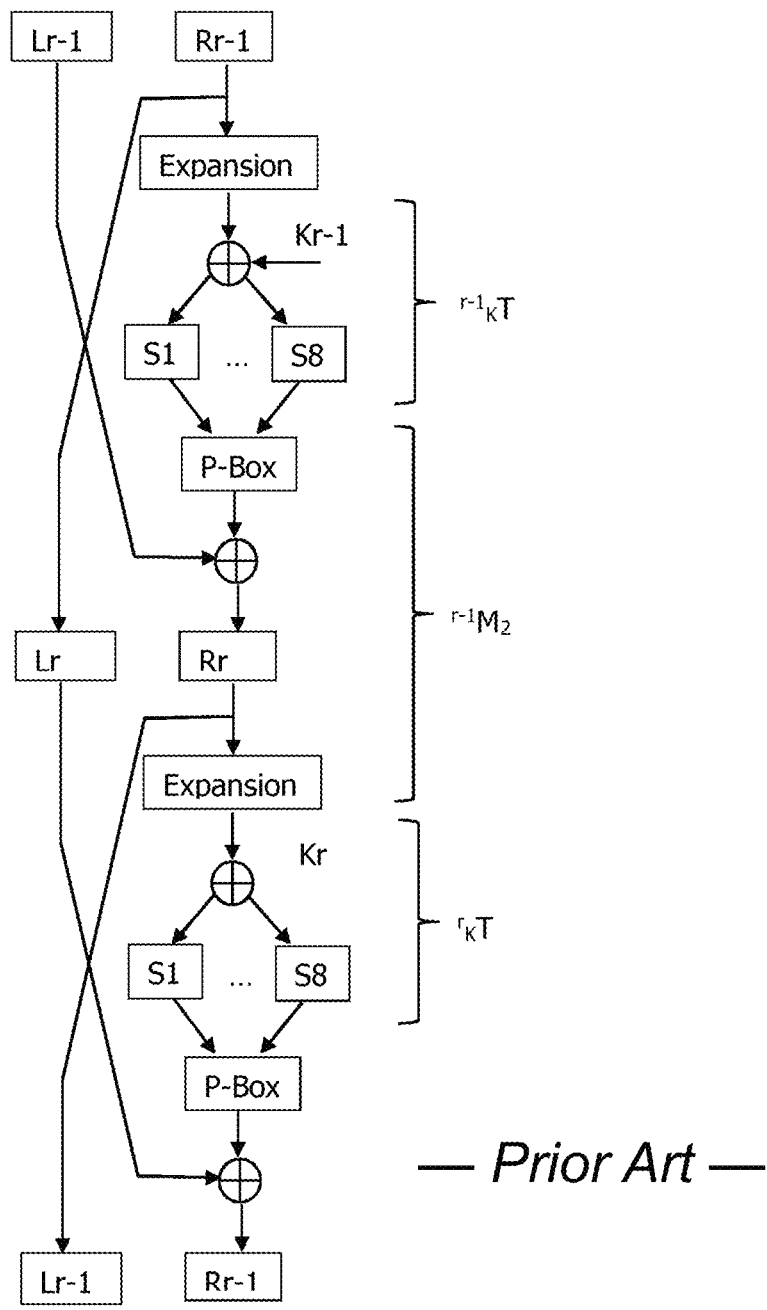
FIG. 1 represents a schematic flowchart of a classical implementation of a DES algorithm.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

An illustrative example is below given for a DES algorithm implementation according to Chow implementation as disclosed in "A White-Box DES Implementation for DRM Applications", Chow and al., Oct. 15, 2002, Pre-proceedings for ACM DRM-2002 workshop.

DES algorithm is performed in 16 rounds, each employing the same eight DES S-Boxes (DSBs), S1 . . . S8, and the same ATs, sandwiched between initial and final ATs, initial and final permutations. Each DBS is an instance of $^4_6E$ as disclosed for example in J. Menezes, P. C. van Oorschot and S. A. Vanstone, Handbook of Applied Cryptography, pp. 250-259, CRC Press, 2001 (5th printing with corrections).

FIG. 1 schematically shows an unrolling of two typical DES rounds where Kr is the round sub-key of round r according to Chow and al. As shown on FIG. 1, a Feistel network with a by-pass left-side data-path Lr−1,Lr,Lr+1 is implemented in the round structure. Other parts of the figure represent an active right-side data-path.

Figure 2:
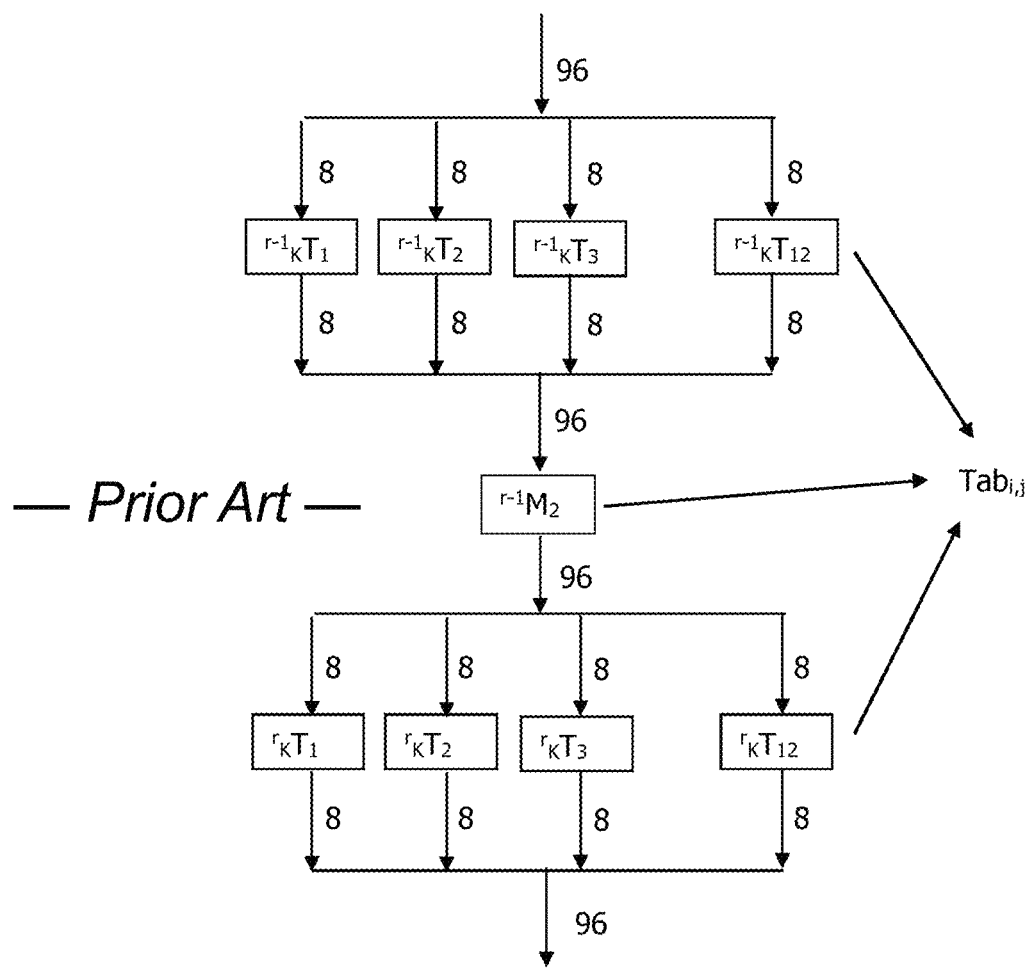
FIG. 2 shows a schematic diagram of an advantageous implementation of the DES algorithm of FIG. 1 as represented as a partial network of table without encodings.

FIG. 2 schematically shows an implementation encoded as proposed in the above cited document. Each round is here represented by two layers: the first layer is composed by 12 T-boxes that embed the xor addition with the round key followed by the non-linear DES S-boxes, and the second layer, represented by $^{r-1}M_2$ in FIG. 2, is a permutation of the state that is compliant with the DES specification and that is implemented using a network of table. In this second layer, the left and right sides are combined into a single 96 bit representation and a single $^rM_2$ transform is used to subsume the P-Box, xor, side flip, and E-box.

An initial matrix $M_1$ is further used to do an initial expansion of the input from 64 bits to the internal 96 bits form and a matrix $M_3$ is used for the final shrink of the output.

A set of matrix is thus used to implement the rounds of the DES algorithm.

New S-Boxes identified as $^r_KS_i$, where K is the encryption key, r is the round number, and i is the corresponding DSB (DES S-box) number are produced, such that, for any given input, $^r_KSi$ yields the same result as $Si$, shown on FIG. 1, would produce in round r if the DES key were K, but the xors of the inputs of the original DSBs have been eliminated. It enables to make the key K disappear from the algorithm.

The obtained implementations are vulnerable to statistical attacks. To counter them, lossy S-Boxes are replaced with a bijective function.

As illustrated on FIG. 2, a split path encoding is performed through calculation of $^r_KT_i(_8e)=^r_KS_i(_8e_1 \ldots _6)\|R(_8e)$, for all $_8e$, for the fixed key K, for round r=1 . . . 16, for S-Box number i=1 . . . 8, where we define $R(_8e)=<_8e_1; _8e_6; _8e_7; _8e_8<$ for all $_8e$.

Thus converted, each $^r_KT_i$ carries eight bits to the next $^rM_2$: 4 bits of S-Box output, 2 bits from the right side and 2 bits that can be chosen to be from the left. This means eight T boxes will only carry 16 bits from the left and 16 bits from the right. This means the by-pass capacity of the $^r_KT_i$'s is too small by 32 bits.

Thus four more S-Boxes are added for each round, these extra S-Boxes make it easier to access the bypassed bits for subsequent processing.

FIG. 2 shows an overall data-flow structure of the DES implementation obtained according to Chow immediately prior to de-linearization of ATs and encoding of S-Boxes.

Thus before de-linearization and encoding, each Mi is representable as a matrix. This means for example that the entire implementation consists of networked 8×4 and 8×8 ($^r_KT_i$) S-Boxes.

Thus a table layer corresponds to "P2,1 $^1_K$Ti-boxes P2,2", the following level corresponds to next packet of "b1,2^{−1}" à "B1,3", then next level is of the "b1,3^{−1}, $^2_K$Ti-boxes, b1,4" type etc.

With the implementation as disclosed in Chow and al, the block-cipher of any cryptographic algorithm as DES or AES are transformed into a series of look-up tables. In particular the standard S-boxes are replaced with key-specific S-boxes. These key-specific S-boxes are adapted to next provide local security. Thus, such an implementation is completed as disclosed in the above cited Chow and al document by application of secret invertible encodings for local security. It comprises mixing bijections for increasing the diffusion and non-linear encodings for increasing the confusion. FIG. 2 shows the overall Chow data-flow structure of the proposed DES implementation immediately prior to de-linearization of at s and encoding of S-Boxes characters. The resulting structure would look just the same after de-linearization and encoding, except that each matrix Mi and each $^r_K T_i$ would be replaced by a corresponding table, below generically noted $Tab_{i,j}$.

Thus, after such operations, a network of tables $Tab_{i,j}$ is built where the index i denotes the ith table of layer j. For the first layer of the round with T-boxes, i is among 1 to 12 and j=r as noted in FIGS. 1 and 2. For next layers corresponding to matrix M, more tables are generally used and some rounds r as presented in previous figures are processed with overlap on different layers, leading to an index j specific to the Chow implementation. All this is disclosed in the prior art. At this stage, on input m, the network of tables $Tab_{i,j}$ computes the value of DES[K](m). However, the intermediary values of the computation are not protected and it is easy to recompute the key K from the knowledge of the intermediary values and the input message.

The DES algorithm is thus embedded in the matrix transformation being an encoded table-based implementation of block-cipher providing local security. The network of tables $Tab_{i,j}$ is converted into a table of networks TCi,j where the tables are protected using input and/or output secret encodings bi,j. This encoding step as known in prior art is schematically shown on FIG. 3.

Figure 3:
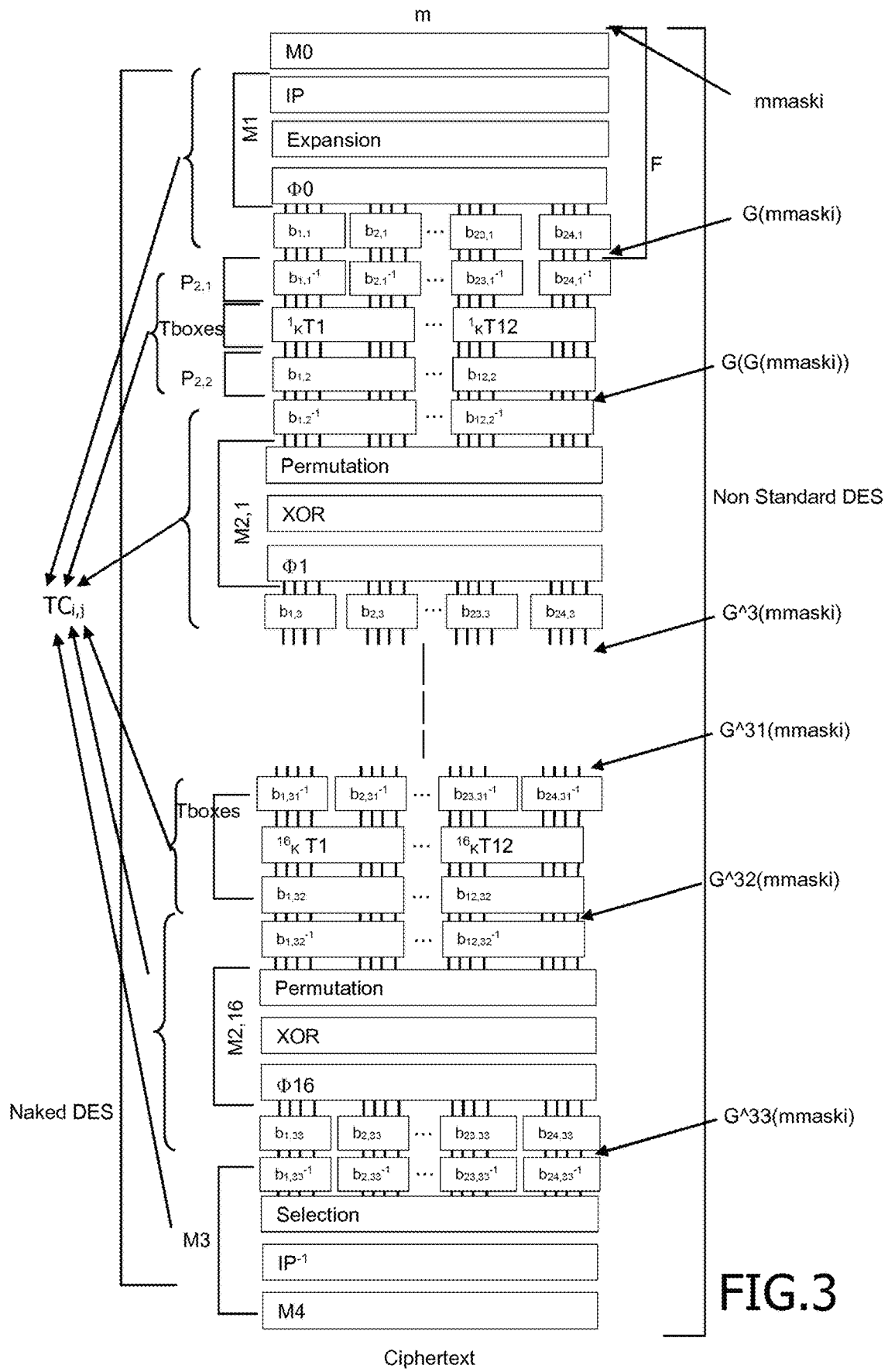
FIG. 3 shows a schematic diagram of an advantageous implementation of the DES algorithm of FIG. 1 modified according to the Chow and al. proposal leading to an encoded table-based implementation of block-cipher of the DES algorithm to be applied to a message.

The invention applies to such an implementation as shown on FIG. 3 to further counter DCA attacks. It proposes an original masking scheme introducing subsequent mask mmaski, G(mmaski) . . . G^32(mmaski) at each layer of tables TCi,j of the algorithm.

The invention proposes to compute message-dependent masking values and (re)-randomization of tables and to compute rounds based on the randomized network of tables to protect a DES or AES implementation that is implemented using Chow et al. in order to be resistant against a second order DCA.

Figure 4:
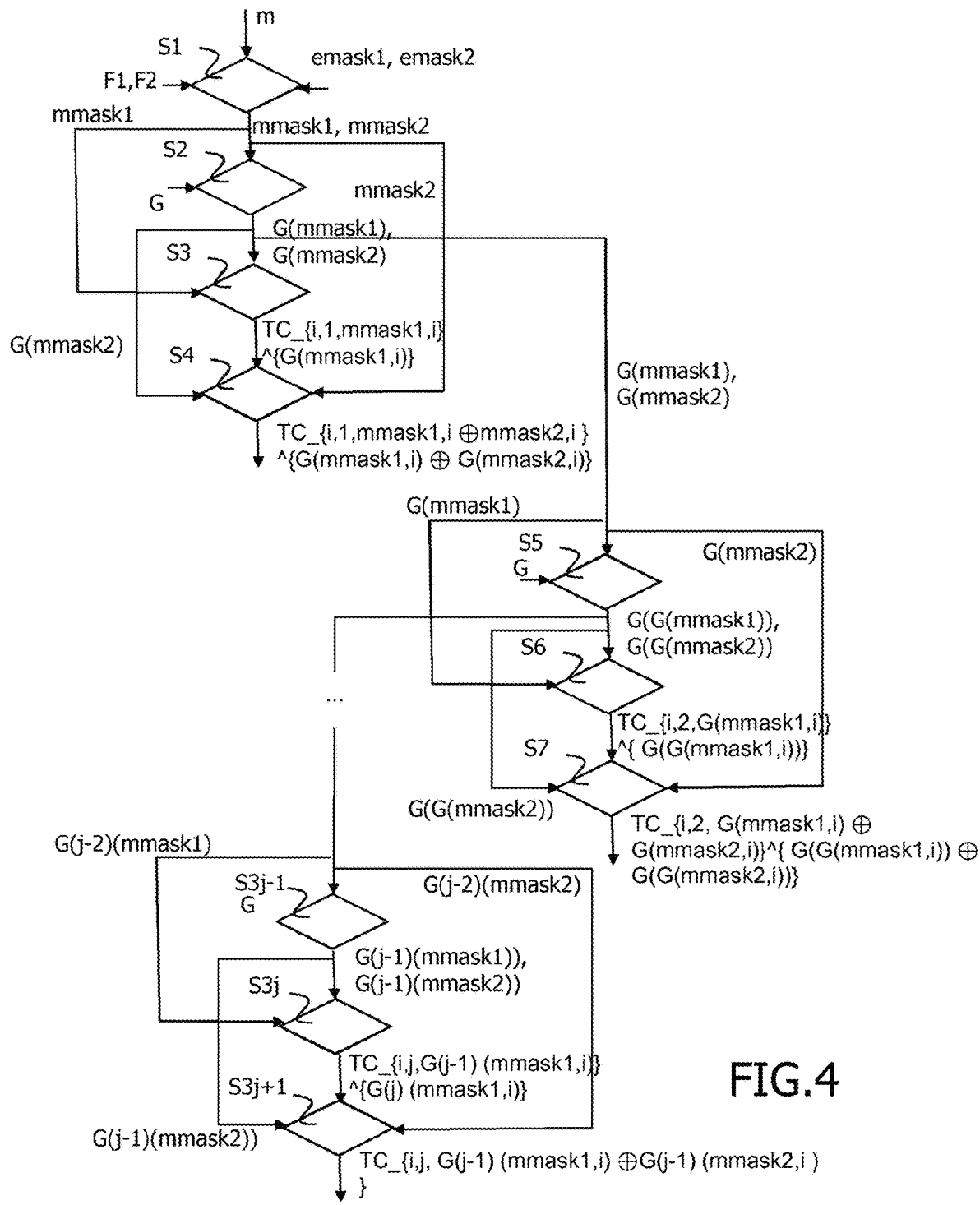
FIG. 4 shows a flowchart of the method of the invention.

As shown on FIG. 4, in a first step S1, two shares of masking value denoted mmask1 and mmask2 are computed for the input of the table network. The input is of 96-bit values for DES and of 128-bit values for AES. These two shares of masking values are based on, at least, two different message derivation functions F1 and F2. Those derivation functions are for example one derivation function based on a hash function and one derivation function based on CRC computation.

In a preferred embodiment, the computation is further based on two values emask1 and emask2 that are obfuscated in the code using ad-hoc obfuscation techniques.

The size of the manipulated values depends on the choice of the block-cipher: 96-bit for a Chow et al. implementation of DES, 128-bit for AES. The principle of the invention is the same in both case.

We have for example, according to the preferred embodiment:

h1=F1(m) (or h1=F1(M))
h2=F2(m) (or h2=F2(M))
mmask1=emask1⊕trunc1—96(h1)⊕trunc1—96(h2)
mmask2=emask2⊕trunc97—122(h1)⊕trunc97—122(h2)

where m is a 96-bit message for DES and M is a 64-bit message for DES. In the DES case, the size depends on whether the message m is the original input M or the message m after the initial transformation in a Chow et al. implementation. For AES, the message M=m and it is a 128-bit message.

In practice, a pseudo random number generator is used to derive the mask from the message. The generator is such that no exploitable algebraic relation exists between the message and its mask. It is here noted that, in a smart card context, the mask is anyhow random and there is no issue regarding the independence between the message and the masking value.

Once the initial values mmask1 and mmask2 are derived using secret obfuscated values, the input message m to the network of tables and the derivation functions F1 and F2, a random secret function G is used in a step S2 in order to derive all the masking values. As an example, G is implemented using tables.

The tables are now randomized in two steps in order to target a resistance against 2nd order analysis.

In more details, for the first layer of tables, one computes in a step S3:

For all x, TC_{i,1,mmask1,i}^{G(mmask1,i)}=TC_{i,1} (x⊕mmask1,i) ⊕G(mmask1,i), and in a step S4:

For all x, TC_{i,1,mmask1,i⊕mmask2,i}^{G(mmask 1)⊕G(mmask2,i)}=TC_{i,1,mmask1,i}^{G(mmask1,i)} (x⊕mmask2,i)⊕G (mmask2,i)

For the second layer, one computes, in a step S5, G(G (mmask1)) and G(G(mmask2)), and in a step S6:

For all x, TC_{i,2,G(mmask1,i)}^{G(G(mmask 1,i))}=TC_{i,2}(x⊕G(mmask1,i))⊕G(G(mmask1,i)) and, in a step S7:

For all x, TC_{i,2, G(mmask1,i)⊕G(mmask2,i)}^{G(G (mmask1,i))⊕G(G(mmask2,i))}=TC_{i,2,G(mmask 1,i)}^{G(G(mmask1,i))} (x ⊕G(mmask2,i))⊕G(G (mmask2,i))

And so on for the other layers. X depends on the table size. For 8-bits sized table, input and output, x describes the set of values [0,1]^8. x corresponds to the input size of the table. The calculation will be performed as many times as there are tables in the layer, this number depending on the type of tables. Tables have an input size and an output size. For T-box tables as an example, input size is 8 bits and output size is 8 bits. For next layer M2,1, XOR tables are necessitated. Thus the input size of a XOR table is 2*4 bits and the output size is 4 bits. AES algorithm requires other sizes of tables.

More generally, for the layer j, one computes in a step S3j−1, G(j−1)(mmask1)) and G(j−1)(mmask2)), and in a step S3j:

For all x, T_{i,j,G(j−1) (mmask1,i)}^{G(j) (mmask 1,i)}=T_{i,j}(x⊕G(j−1) (mmask1,i))⊕G(j) (mmask1,i) and, for a step S3j+1:

For all x, T_{i,j, G(j−1) (mmask1,i)⊕G(j−1) (mmask2,i)}^{G(j) (mmask1,i)⊕G(j) (mmask2,i)}=T_{i,j, G(j−1) (mmask1,i)}^{G(j) (mmask1,i)}(x⊕G(j−1)(mmask2,i)⊕G(j) (mmask2,i)

Once all the tables have been re-randomized, the last step of computing rounds based on the randomized network of tables is performed.

With the invention, the input message M is transformed to an input message m for the network of tables and the message m is randomized using mmask1 and mmask2.

Consequently, the input to the network of randomized tables is m⊕mmask1⊕mmask2. At this step, it is important to avoid the computation of mmask1⊕mmask2. One possibility is for example to compute first m⊕mmask1 and next (m⊕mmask1)⊕mmask2.

The proposed implementation does not manipulate the masking value mmask1⊕mmask2 nor the other masking values G(j)(mmask1) ⊕G(j)(mmask2) for the inputs and outputs of tables. It enables to protect against the second order DCA.

When, depending on the network of table, there is a need to recombine several inputs, then it is necessary to add a re-adjustment step between layers. Indeed, the masking value of the output of a Table is not necessarily compliant with the masking value of the input of the next layer. It is thus necessary to add an additional step to re-adjust the masking value with the appropriate masking value. This operation renders the attacks even more difficult.

A generalization of the invention to the order t and the immunity t is given in the following.

Instead of managing 2 values mmask1 and mmask2, t values mmask1, mmask2, . . . , mmaskt are managed. Instead of deriving the shares of masking values using 2 functions, p functions h1, . . . , hp are used. An additional property is thus targeted, i.e. if the attacker succeeds in setting to a constant at most p−1 relevant values during the execution, then all the components mmask1, . . . , mmaskt will however vary. For example, for a DES algorithm:

h1=F1(m)
h2=F2(m)
. . .
hp=Fp(m)
mmask1=emask1⊕trunc1—96(h1)⊕trunc1—96(h2) ⊕ . . . ⊕trunc1-96 (hp)
mmask2=emask2⊕trunc97—122 (h1)⊕trunc97—122 (h2)⊕ . . . ⊕trunc97—122 (hp)
. . .
mmaskt=emaskt⊕trunc1+96(t−1)—96t(h1)⊕trunc1+96(t−1)-96t (h2)⊕ . . . ⊕trunc1+96(t−1)—96t (hp)

where the functions h1, . . . , hp takes as input a 64-bit input message or 96-bit input message for DES and 128-bit input message for AES. It provides output messages of length 96t for DES and 128t for AES.

Once the initial masking values mmask1, . . . , mmaskt are derived using secret obfuscated values, the input message m to the network of tables and the derivation functions F1, . . . , Ft, a random secret function G is used in order to derive all the masking values. As an example, G is implemented using tables.

All the tables of the network are now randomized in t steps in order to target a resistance against tth order analysis.

Firstly the tables of the first layer are randomized using the masking value mmask1 on the input and G(mmask1) on the output. Then the tables of the previous step are re-randomized using the masking value mmask2 on the input and G(mmask2) on the output. Successive similar randomization are performed. Thus in a tth step for the first layer, the tables of the previous step are re-randomized using the masking value mmaskt on the input and G (mmaskt) on the output.

Next, the tables of the second layer are randomized using the masking values on input G(mmask1), . . . , G(mmask) and the masking values on the output of the tables G(G(mmask1)), . . . , G(G(mmask)).

More generally, the tables of the jth layer are randomized by using on input the masking values G(j−1)(mmask 1), . . . , G(j−1)(mmask) and on the output G(j)(mmask 1), . . . , G(j)(mmask).

Once all the tables have been (re)-randomized, the last step of computing rounds based on the randomized network of tables is performed.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to counter DCA attacks of order 2 and higher order applied on an encoded table-based (TC$_{i,j}$) implementation of block-cipher of a cryptographic algorithm to be applied to a message (m), said method comprising the steps of:
   translating a cryptographic algorithm block-cipher to be applied on a message (m) into a series of look-up tables (Tab$_{i,j}$) organized in several layers,
   applying secret invertible encodings to get a series of encoded look-up tables (TCi,j),
   computing message-dependent masking values, comprising the computation of at least two shares of masking value (mmask1, mmask2) for the input of the table network based on at least two different message derivation functions (F1, F2),
   re-randomizing the encoded tables (TCi,j) in at least two steps using the computed message-dependent masking values (mmask1,mmask2), comprising:
     randomizing tables of a first layer using a masking value (mmask1) on the input and the image of said masking value by a random secret function (G(mmask1)) on the output,
     re-randomizing said randomized tables of the first layer using another masking value (mmask2) on the input and the image of said other masking value by the random secret function (G(mmask2)) on the output,
     re-randomizing the tables of each other layer j as follows, i being the index of the table in the layer: computation of, for all x, TC_{i,j,G(j−1) (mmask1, i)}(x)^{G(j) (mmask1,i)}=TC_{i,j}(x⊕G(j−1) (mmask1,i)) ⊕G(j) (mmask1,i) and, for all x, TC_{i, j, G(j−1) (mmask1,i) ⊕G(j−1) (mmask2,i) }(x)^{G(j) (mmask1,i) ⊕G(j) (mmask2,i)}=TC_{i,j, G(j−1) (mmask1,i)}^{G(j) (mmask1,i)} (x⊕G(j−1) (mmask2,i) ⊕G(j) (mmask2,i),
   computing rounds to be applied on the message (m) based on the re-randomized network of tables (TCi,j).

2. The method according to claim 1, wherein the computation of at least two shares of masking value (mmask1, mmask2) for the input of the table (TCi,j) network is further based on at least two secret constant values (emask1, emask2) obfuscated in the code using obfuscation techniques.

3. The method according to claim 2, wherein the at least two shares of masking values (mmask1,mmask2) are obtained as follows, with n being an integer depending on the concerned cryptographic algorithm block-cipher and emask1 and emask2 being said secret constant values:

h1=F1(m) (or h1=F1(M))
h2=F2(m) (or h2=F2(M))
mmask1=emask1⊕trunc1—n(h1)⊕trunc1—n(h2)
mmask2=emask2⊕truncn+1—2n(h1)⊕truncn+1—2n(h2).

4. The method according to claim 3, wherein, the cryptographic algorithm block-cipher being part of a DES algorithm, n=96.

5. The method according to claim 3, wherein, the cryptographic algorithm block-cipher being part of an AES algorithm, n=128.

6. The method according to claim 2, wherein the step of computing message-dependent masking values comprises the computation of t values mmask1, mmask2, . . . , mmaskt for the input of the table network based on t secret constant values (emask1, emaskt) obfuscated in the code using obfuscation techniques and p derivation functions (F1, . . . , Fp).

7. The method according to claim 1, wherein the accumulative application of the random secret function (G) is as follows, i being the index of the table in the layer, for the first layer of tables (T), computation of, for all x, TC_{i,1,0}(x)^{G(mmask1,i)}=TC_{i,1}(x⊕mmask1,i)
⊕ G (mmask1,i) and, for all x, TC_{i,1,}(x) ^{G (mmask1,i)⊕G(mmask2,i)}=
TC_{i,1,0}^{G(mmask1,i)} (x)⊕G (mmask2,i).

8. The method according to claim 1, wherein the accumulative application of the random secret function (G) is as follows, i being the index of the table in the layer: for the first layer of tables, computation of, for all x, TC_{i,1,mmask1,i}(x)^{G(mmask1,i)}=TC_{i,1}(x⊕mmask1,i)
⊕ G (mmask1,i) and, for all x, TC_{i,1,mmask1,i⊕mmask2,i}(x) ^{G(mmask1,i)⊕ G(mmask2,i)}=
TC_{i,1,mmask1,i}^{G(mmask1,i)} (x⊕ mmask2,i) ⊕ G (mmask2,i).

9. The method according to claim 1, wherein the message (m) is firstly combined with a first share (mmask1) of masking value (m ⊕mmask1) and then the result is combined with the next share of masking value (mmask2) ((mmask1) mmask1).

* * * * *